UNITED STATES PATENT OFFICE.

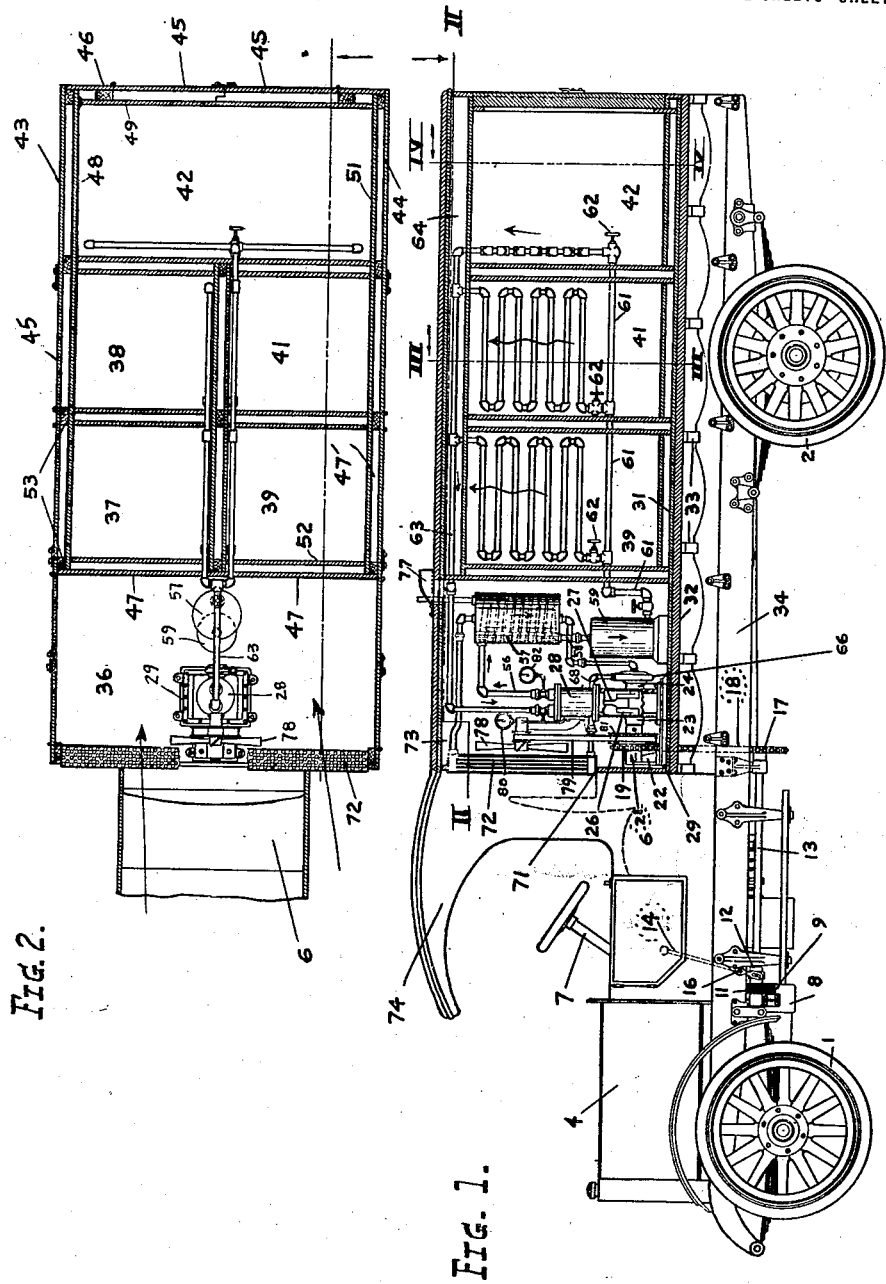

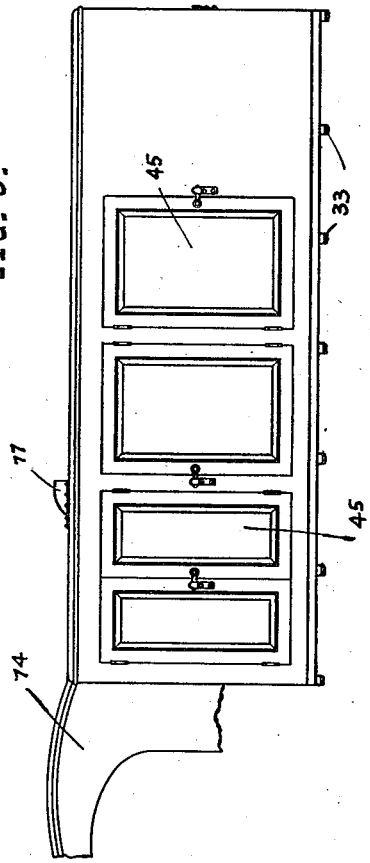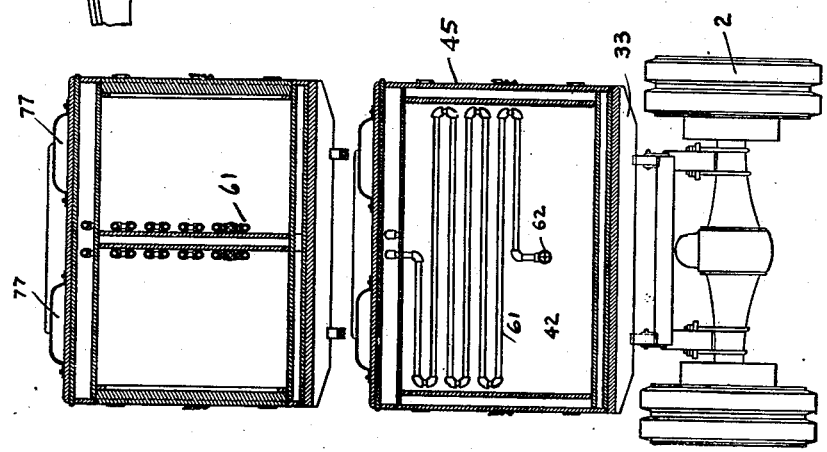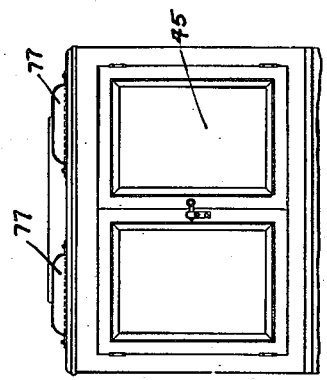

ROBERT D. HATCH, OF SAN FRANCISCO, CALIFORNIA.

REFRIGERATOR-VEHICLE.

1,341,744. Specification of Letters Patent. Patented June 1, 1920.

Application filed November 6, 1918. Serial No. 261,335.

*To all whom it may concern:*

Be it known that I, ROBERT D. HATCH, a citizen of the United States, residing at the city and county of San Francisco and State of California, have made a new and useful invention—to wit, Refrigerator-Vehicles; and I hereby declare the following to be a written description of the same in such full, clear, concise, and exact terms as to enable any person skilled in the art or science to which it appertains or to which it is most nearly connected to make, construct, and use the same.

The primary object of the invention is to provide a motor vehicle with a refrigerating apparatus designed for the preservation of perishable food stuffs in transit in which the refrigerating apparatus is driven by the vehicle motor so arranged that the refrigerating apparatus may be operated synchronously with the vehicle or independently thereof.

An important object of my invention is the facility with which the contents of the refrigerator compartments may be displayed and the accessibility of the compartments to the operator. The doors 45 of the several compartments may be of glass and may be hinged or arranged to slide or both.

The invention is specially applicable to an automobile truck upon which I mount the refrigerating apparatus, and in this specification and the annexed drawings I have described and illustrated the form considered by me to be the best form but it is to be understood that the invention is not limited to such form and may be embodied in other forms, while the claims are intended to cover the invention in all forms in which it may be embodied.

In the accompanying drawings,

Figure 1 is a side elevation of the refrigerator truck, the body portion of the same being shown in vertical section for the purposes of illustration.

Fig. 2 is a top plan view of the body portion shown in Fig. 1 and taken on the line II—II Fig. 1.

Fig. 3 is a vertical cross section of the refrigerator body of the truck, taken on the line III—III Fig. 1.

Fig. 4 is a rear view of the truck frame, the body being shown in section on the line IV—IV of Fig. 1.

Fig. 5 is a side elevation of my refrigerator truck body, and

Fig. 6 is rear end elevation of the same.

Referring to the drawings, the numeral 1 indicates one of the front wheels, and 2 one of the rear wheels of a motor truck of conventional form driven by an engine within the hood 4. The truck is controlled from the driver's seat 6 and steered at the steering column 7. The parts described so far form no part of the present invention.

The fly wheel of the engine of the truck is cased in a suitable housing 8 beneath the engine, and the said casing 8 is cut away as shown at 9 to allow passage therethrough of a gear wheel 11 having a shifting collar 12 integral therewith, both gear and shifting collar being slidably keyed on a shaft 13 and movable longitudinally on said shaft by a lever 14 fulcrumed as shown at 16, thus giving control of the gear 9 from the driver's seat.

It is common practice to provide the fly wheels of motor trucks with a peripheral gear, sometimes used for starting. The gear wheel 9 is adapted to mesh with the said peripheral gear and derive power from it while the engine of the truck is in motion.

On the end of the shaft 13, opposite the gear 9, is a sprocket wheel 17 which drives an endless chain 18, which also surrounds a sprocket wheel 19 keyed to a shaft 21 journaled in bearings 22, 23, and 24.

The shaft 21 is provided with a crank 26 having a pitman rod 27 which reciprocates a piston in a compressor 28 forming part of the mechanical refrigerating system. The bearings 22, 23 and 24 are secured to a bed plate 29 which is suitably secured to a floor 31 resting on a planking 32 supported by sills 33 suitably secured to the frame 34 of the truck. The body of the truck is divided into compartments 36, 37, 38, 39, 41 and 42 as shown in Fig. 2. The compartments 37 to 42 inclusive are refrigeration cells for storage in transit of perishable articles. The body portion of the truck comprises two outer side walls 43 and 44 and rear wall 46 provided with suitable doors 45 affording access to the various compartments. A cross wall 47 separates the compartment 36 from compartments 37 and 39. In order to provide air spaces between the various cells, as shown at 47', I have provided inner walls 48, 49, 51 and 52, which are spaced from the outer walls by studs 53. The spaces between the inner and outer walls of the cells may be dead air space or may be filled with ground cork or any material calculated to exclude heat from the said cells. The compartment 36 of the body incloses on three sides the various members of the machinery for circulating the refrigerating liquid through the cells of the body.

In the form of my invention here shown, I have elected to use the direct expansion system of refrigeration, but it is obvious that the brine system might be used to advantage in conjunction therewith under certain climatic conditions.

The refrigerating liquid circulated by the compressor 28 is forced through a pipe 56 through a condensing coil 57, thence through a pipe 58 to the ammonia collector 59. It is then forced through a pipe 61 which extends rearwardly through the body of the truck, and is provided with valves 62 which control the supply to the various individual compartments. The liquid is forced upward in the direction of the arrows in Fig. 1 through the return pipe 63 extending overhead through an air space 64 into the compartment 36, whence it is returned to the compressor 38, thus forming a continuous circulation of the refrigerating liquid as it is alternately condensed and expanded during its change of temperature.

In order to more efficiently cool the condensing coil 57, I have provided an auxiliary circulation system of water, brine, or any suitable cooling liquid, the means for circulating said fluid being driven by the same shaft that drives the compressor. For this purpose, I have provided a pump 66 connected directly to the compressor shaft and provided with a coil pipe 67 fed from the bottom of the condenser coil container 57 and the said pump is also provided with an outlet pipe 68 which conducts the cooling fluid to the lower end of a radiator 71 constructed of pipes, as shown at 72.

While the radiator construction forms no part of the present invention, I prefer to use a radiator formed of vertical pipes having fins thereon adapted to cool by an inrushing current of air around and between said pipes as the vehicle is propelled. The cooling fluid leaves the radiator at the top through a pipe 73 leading to the top of the condenser coil container 57.

It will be seen by this construction that a continuous circulation of cooling fluid is provided through and around the condensing coils.

In order to further cool the compartment 36 and to keep the radiator and pipe connections thereto at a low degree of temperature, I have provided for a circulation of air when the truck is in motion through the compartment 36, as shown by the arrows in Fig. 2.

When the truck travels forward, the air passes between the vertical pipes of the radiator being deflected by the hood 74 above the driver's seat and forced downward at the rear of said seat into the chamber 36, which is provided with a plurality of ventilators 77 which may be disposed on the roof or at the sides or both, as best meets the conditions under which the truck is to be used. The circulation of air through the chamber 36 may be accelerated by the use of a fan 78 driven by a belt 79 passing around a pulley 80 81 driven by the shaft 21 which drives the compressor 38.

The purpose of the fan is to provide a means of circulating the air around the pipes 72 of the radiator while the truck is standing still.

The inlet and outlet pipes of the compressor are provided respectively with pressure gages 81 and 82 affording a means of determining the pressure under which the refrigerating apparatus is operated.

I have provided in the means so far described, a refrigerator truck in which the mechanical refrigeration is accomplished by power derived from the mechanism driving the truck, and it is obvious that the refrigeration may be continued while the truck is standing, or while it is in motion, and that the circulation throughout the refrigerating system may be discontinued at the will of the driver without leaving his seat.

It will be seen that I have provided means for utilizing the air current generated by the speed of the truck, and have provided an auxiliary cooling fluid circulation for further cooling the condensing coils of the refrigerating liquid.

A refrigerating vehicle built on the lines herein described will be a distinct advance in this art and will be the means of transporting in good condition many perishable articles which are not now commonly carried to remote distances because of their perishable nature.

A refrigerator vehicle which accomplishes the purpose claimed for this invention will be a valuable adjunct to a military transport corps. Obviously there may be many changes in the details of construction here shown, and modifications within the purview of my invention will readily suggest themselves to those skilled in the art of refrigeration, and I do not wish to confine myself to the precise construction shown herein, but rather to have the specification and appended claims construed broadly to include any modification that may properly fall within the scope of my invention.

I have illustrated the refrigerating apparatus as mounted directly on the motor 1 vehicle, but it may be mounted on a trailer or other structure connected by appropriate mechanism with the motor vehicle.

Having thus described my invention, what I claim as new and desire to secure by Letters Patent of the United States is as follows:

1. In combination with a motor-driven vehicle, an apparatus for evaporating and circulating a refrigerating fluid in a closed circuit, an apparatus for circulating a cooling fluid around a portion of the refrigerating apparatus, a radiator interposed in the cooling fluid apparatus, and a fan adapted to direct air around the radiator for cooling purposes while the vehicle is standing still.

2. In a motor propelled vehicle a plurality of refrigerator compartments and means operated by the vehicle motor to induce the cooling of said compartments, including means for circulating and evaporating a refrigerating fluid in conduits through said compartments, and a radiator interposed in the said conduits exposed to air circulation for cooling the circulating fluid.

In testimony whereof I have hereunto set my hand at San Francisco, California, this 30th day of October, 1918.

ROBERT D. HATCH.

In presence of—
JOHN H. MILLER,
P. S. PIDWELL.